(12) United States Patent
Fujimoto et al.

(10) Patent No.: US 9,666,316 B2
(45) Date of Patent: May 30, 2017

(54) NUCLEAR POWER PLANT CONTROL SYSTEM AND METHOD OF TESTING NUCLEAR POWER PLANT

(75) Inventors: Hiroshi Fujimoto, Tokyo (JP); Hironobu Shinohara, Tokyo (JP); Yasutake Akizuki, Tokyo (JP); Toshiki Fukui, Tokyo (JP); Yuichi Tanaka, Tokyo (JP); Shinji Kiuchi, Tokyo (JP); Hiroshi Shirasawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 652 days.

(21) Appl. No.: 13/825,256

(22) PCT Filed: Sep. 21, 2011

(86) PCT No.: PCT/JP2011/071433
§ 371 (c)(1),
(2), (4) Date: Mar. 20, 2013

(87) PCT Pub. No.: WO2012/043318
PCT Pub. Date: Apr. 5, 2012

(65) Prior Publication Data
US 2013/0301771 A1 Nov. 14, 2013

(30) Foreign Application Priority Data
Sep. 30, 2010 (JP) .................................. 2010-222485

(51) Int. Cl.
*G21D 3/08* (2006.01)
*G21D 3/00* (2006.01)
*G21C 17/00* (2006.01)

(52) U.S. Cl.
CPC .............. *G21D 3/00* (2013.01); *G21C 17/00* (2013.01); *G21D 3/001* (2013.01); *G21D 3/008* (2013.01); *Y02E 30/40* (2013.01)

(58) Field of Classification Search
USPC .......................................................... 376/217
See application file for complete search history.

(56) References Cited

U.S. PATENT DOCUMENTS 3,826,094 A * 7/1974 Conrad, Jr. ............. F01D 21/02
290/4 R
4,584,165 A * 4/1986 Wilson ...................... G21C 7/36
376/216
5,817,958 A * 10/1998 Uchida et al. ............... 73/865.9

FOREIGN PATENT DOCUMENTS

JP 61-036809 A 2/1986
JP 63-281597 A 11/1988
(Continued)

OTHER PUBLICATIONS

English translation of Written Opinion of PCT/JP2011/071433, mailing date of Oct. 18, 2011.
(Continued)

*Primary Examiner* — Sean P Burke
(74) *Attorney, Agent, or Firm* — Westerman, Hattori, Daniels & Adrian, LLP

(57) ABSTRACT

A nuclear power plant control system (1) includes a control button (21) which receives an operation for controlling a control target device (40), a notification lamp (12) which notifies that a control signal corresponding to the operation received by the control button (21) arrives at a predetermined position on a path connected from a control panel (20) to the control target device (40), and a control signal inhibition unit (33) which inhibits a control signal from arriving at the control target device (40) in midstream between the predetermined position on the path and the control target device (40) in response to an operation received by a test permission button (11).

3 Claims, 4 Drawing Sheets

(56) References Cited

FOREIGN PATENT DOCUMENTS

| JP | 64-70802 A | 3/1989 |
| JP | 5-158531 A | 6/1993 |
| JP | 2000-56803 A | 2/2000 |
| JP | 2001-195104 A | 7/2001 |
| JP | 2002-108443 A | 4/2002 |
| JP | 2003-15733 A | 1/2003 |

OTHER PUBLICATIONS

Japanese Office Action dated Jul. 1, 2014, issued in corresponding Japanese Patent Application No. 2010-222485, w/ English translation (5 pages).
Decision of a Patent Grant dated Nov. 4, 2014, issued in corresponding Japanese Patent Application No. 2010-222485, with Partial English Translation (3 pages).
International Search Report for PCT/JP2011/071433, mailing date of Oct. 18, 2011.
Written Opinion of PCT/JP2011/071433, mailing date of Oct. 18, 2011.

* cited by examiner

NUCLEAR POWER PLANT CONTROL SYSTEM AND METHOD OF TESTING NUCLEAR POWER PLANT

FIELD

The present invention relates to a nuclear power plant control system and a method of testing a nuclear power plant, and particularly relates to a nuclear power plant control system and a method of testing a nuclear power plant capable of conducting a test during an operation of the nuclear power plant.

BACKGROUND

A nuclear power plant control system that controls a nuclear power plant is requested to regularly test each function to maintain high reliability. For example, a test of each function of the nuclear power plant control system that controls a nuclear power plant is conducted using test equipment during a periodical check when a nuclear reactor is shut down (for example, see Patent Literature 1).

Recently, by applying a digital control device, software within a control device included in a nuclear power plant control system may maintain reliability through self-examination without a conventional periodical test. For this reason, a portion using a manual test is a hard-wired device (switch, cable, and the like) of an external unit or an input/output unit.

CITATION LIST

Patent Literature

Patent Literature 1: Japanese Patent Application Laid-open No. 2002-108443

SUMMARY

Technical Problem

However, since a length of a periodical check period is limited, it is preferable that a test of each function of a nuclear power plant control system be conducted during an operation of a plant as possible. In particular, in the US, a periodical check period is shortened, and a desire for permitting a test during an operation of a plant is strong.

The invention is conceived in view of the above description, and an object of the invention is to provide a nuclear power plant control system and a method of testing a nuclear power plant capable of conducting a test during an operation of the nuclear power plant.

Solution to Problem

According to an aspect of the present invention, a nuclear power plant control system includes: an operation unit which receives an operation for controlling a specific portion of a nuclear power plant; a notification unit which notifies that a control signal corresponding to the operation received by the operation unit arrives at a predetermined position on a path connected to the portion; and an inhabitation unit which inhibits the control signal from arriving at the portion in a position between the predetermined position on the path and the portion.

In the nuclear power plant control system, a control signal may be inhibited from arriving at a control target, and a detection of a control signal at a predetermined position is notified even when the control signal is blocked. Accordingly, it is possible to test whether a control signal arrives at a predetermined position while an operation of a nuclear power plant is continued.

Advantageously, in the nuclear power plant control system, the operation unit is provided in a central control room of the nuclear power plant, and the notification unit notifies an operator present in the central control room.

In this embodiment, since an operator present in a central control room may conduct a test, it is possible to reduce personnel needed for the test.

Advantageously, in the nuclear power plant control system, the inhabitation unit inhibits the control signal from arriving at the portion when a signal indicating a state of being on test is received.

In this embodiment, by transmitting a signal indicating a state of being on test, it is possible to conduct a test while an operation of a nuclear power plant is continued.

Advantageously, in the nuclear power plant control system, the inhabitation unit is a majority circuit that causes a control signal to arrive at the portion only when a plurality of control signals are received through different paths.

In this embodiment, by not transmitting signals from a plurality of systems, it is possible to conduct a test while an operation of a nuclear power plant is continued.

Advantageously, in the nuclear power plant control system, the inhabitation unit is a majority circuit that causes a nuclear reactor trip signal to arrive at the portion when receiving the nuclear reactor trip signal as a control signal from detecting units of at least N (N is an integer greater than or equal to 2) systems among detecting units of a plurality of systems, the operation unit is provided to correspond to each of the detecting units of the plurality of systems, and an OR operation is performed on a control signal indicating that the operation unit is operated and a signal output by the detecting unit of a system corresponding to the operation unit before the control signal is detected at the predetermined position.

In this embodiment, by transmitting a signal from a system, it is possible to conduct a test associated with a nuclear reactor trip while an operation of a nuclear power plant is continued.

According to another aspect of the present invention, a method of testing a nuclear power plant includes: receiving an operation through an operation unit which receives an operation for controlling a predetermined portion of a nuclear power plant; detecting a control signal corresponding to the operation received by the operation unit at a predetermined position on a path connected to the portion; notifying that the control signal arrives at the predetermined position; and inhibiting the control signal from arriving at the portion in a position between the predetermined position on the path and the portion.

In the method of testing a nuclear power plant, a control signal may be inhibited from arriving at a control target, and a detection of a control signal at a predetermined position is notified even when the control signal is blocked. Accordingly, it is possible to test whether a control signal arrives at a predetermined position while an operation of a nuclear power plant is continued.

Advantageous Effects of Invention

A nuclear power plant control system and a method of testing a nuclear power plant according to the embodiment have an effect of being able to conduct a test during an operation of a nuclear power plant.

DESCRIPTION OF EMBODIMENTS

Hereinafter, embodiments of a nuclear power plant control system and a method of testing a nuclear power plant according to the invention will be described in detail based on drawings. It should be noted that the invention is not limited to the embodiments. In addition, elements in the embodiments include elements that may be easily assumed by those skilled in the art, substantially identical elements, and so-called equivalents.

First Embodiment

Figure 1:
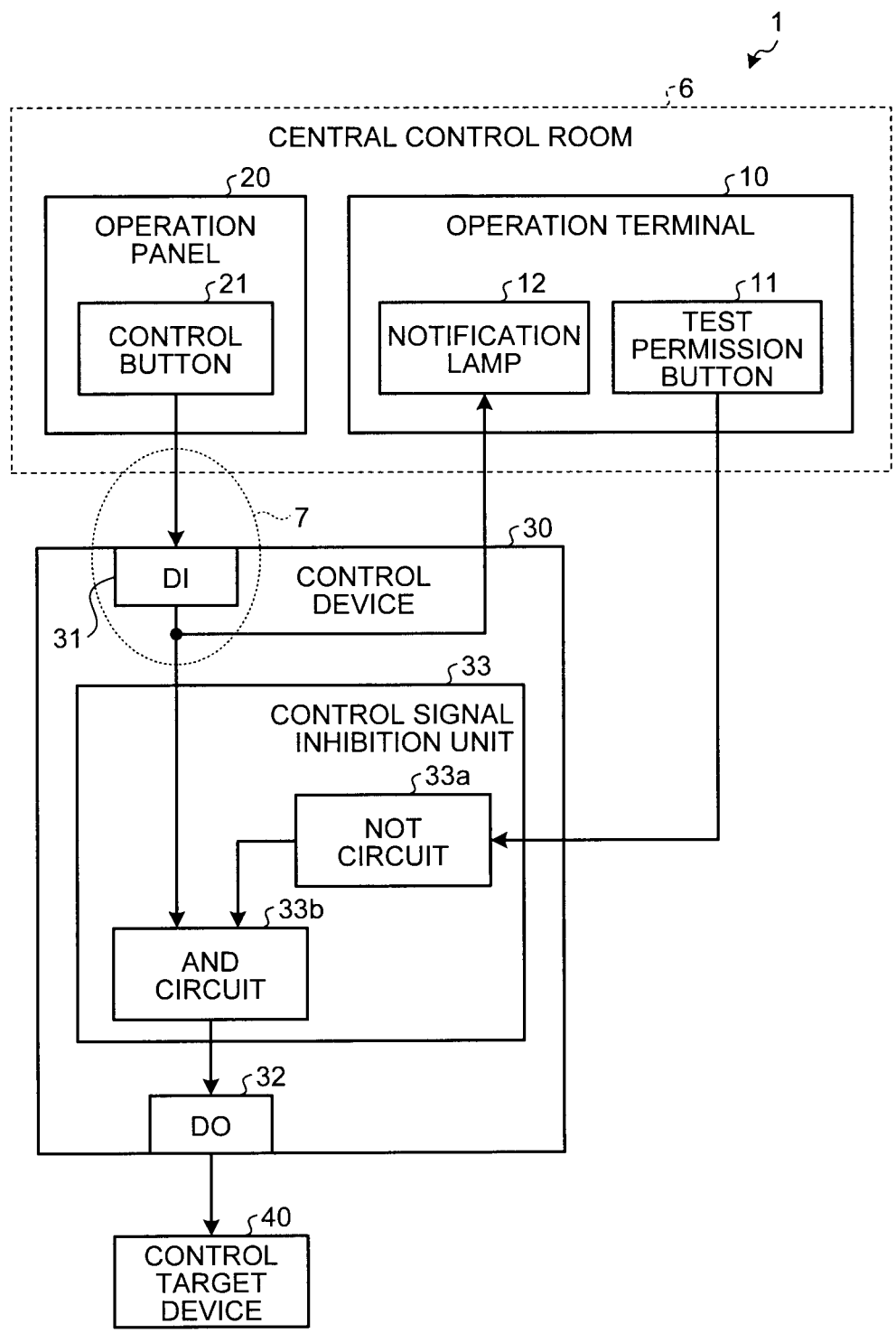
FIG. 1 is a diagram illustrating a schematic configuration of a nuclear power plant control system according to a first embodiment.

In addition, a configuration of a nuclear power plant control system according to a first embodiment will be described with reference to FIG. 1. FIG. 1 is a diagram illustrating a schematic configuration of a nuclear power plant control system 1 according to the first embodiment. As illustrated in FIG. 1, the nuclear power plant control system 1 includes an operation terminal 10, a control panel 20, a control device 30, and a control target device 40. The operation terminal 10 and the control panel 20 are installed inside a central control room 6.

The operation terminal 10 receives various operations for operating a nuclear power plant, and shows various types of information associated with an operation condition of the nuclear power plant. The control panel 20 includes a control button 21, and transmits a control signal for controlling the control target device 40 to the control device 30 in response to an operation received by the control button 21. The control panel 20 may be integrated with the operation terminal 10. In addition, the control button 21 may be a physical button, and may be a virtual button displayed on a screen.

The control target device 40 provides a predetermined function based on a control signal transmitted by the control panel 20. For example, the control target device 40 corresponds to a valve, a pump, a heater, and the like provided in the nuclear power plant.

The control device 30 performs predetermined arithmetic processing based on an input signal, and outputs a signal corresponding to a result of the operation. In addition, the control device 30 has a function of conducting a test with respect to an operation of the control button 21 without suspending an operation of the nuclear power plant. As a configuration associated with the function, the control device 30 includes a digital input unit (DI) 31, a digital output unit (DO) 32, and a control signal inhibition unit 33.

The DI 31 receives a control signal transmitted from the control panel 20. The DO 32 transmits a control signal to the control target device 40. The control signal inhibition unit 33 includes a NOT circuit 33a and a AND circuit 33b, and inhibits a control signal received by the DI 31 from being transmitted from the DO 32 to the control target device 40 based on an operation performed on the operation terminal 10.

Specifically, the operation terminal 10 is provided with a test permission button 11, and the operation terminal 10 transmits, as a test permission signal, "1" (High) or "0" (Low) to the control signal inhibition unit 33 in response to an operation performed on the test permission button 11. Herein, it is presumed that a test permission signal "1" indicates a state of being on test with respect to an operation of the control button 21, and a test permission signal "0" indicates a state of being in normal operation. The test permission button 11 may be a physical button, and may be a virtual button displayed on a screen.

The control signal inhibition unit 33 inverts a test permission signal in the NOT circuit 33a, and inputs the inverted test permission signal to the AND circuit 33b. In addition, the control signal inhibition unit 33 inputs a control signal received by the DI 31 to the AND circuit 33b. The AND circuit 33b performs an AND operation on the inverted test permission signal and the control signal, and outputs a result of the operation to the DO 32.

Thus, when the test permission signal is "1", that is, during a test with respect to an operation of the control button 21, the control signal inhibition unit 33 inhibits the control signal received by the DI 31 from being transmitted from the DO 32 to the control target device 40. In addition, when the test permission signal is "0", that is, during a normal operation, the control signal inhibition unit 33 transmits the control signal received by the DI 31 from the DO 32 to the control target device 40.

In addition, the control device 30 is configured such that a control signal received by the DI 31 branches before being input to the control signal inhibition unit 33, and the branching control signal is transmitted to the operation terminal 10. The operation terminal 10 includes a notification lamp 12, and turns on the notification lamp 12 when a control signal is transmitted from the control device 30. That is, the nuclear power plant control system 1 is configured such that when a control signal transmitted in response to an operation of the control button 21 is output from the DI 31 to the control signal inhibition unit 33, the corresponding information is notified by the notification lamp 12 regardless of whether the control signal inhibition unit 33 blocks the control signal.

In the nuclear power plant control system 1 having a configuration described above, when a test target portion 7 (a portion at a front of and at a rear of the DI 31) illustrated in FIG. 1 is needed to be tested with respect to an operation of the control button 21 during an operation of the nuclear power plant, an operator inside the central control room 6 performs an operation as follows.

First, the operator operates the test permission button 11 so that a signal indicating a state of being on test with respect to an operation of the control button 21 is transmitted from the operation terminal 10 to the control device 30. Next, the operator operates the control button 21, and verifies a notification being performed by the notification lamp 12 in response to the operation. In this instance, a control signal is blocked by the control signal inhibition unit 33, and does not arrive at the control target device 40. Then, after verifying a notification of the notification lamp 12, the control button 21 is returned to an original state, and the test permission button 11 is returned to an original state.

Through the operation described in the foregoing, even when the nuclear power plant is in operation, it is possible to test whether the test target portion 7 is normally functioning without changing a control state of the control target device 40.

In addition, the nuclear power plant control system 1 has a merit of being able to reduce equipment and personnel needed for a test. A test of a nuclear power plant control system has been conducted using test equipment attached to a control device included in the nuclear power plant control system. For this reason, in a conventional nuclear power plant control system, an operator who operates test equipment is needed to be disposed near a control device in addition to an operator inside a central control room to conduct a test during an operation of a nuclear power plant. In the nuclear power plant control system 1, since a test may be conducted while an operator is inside the central control room 6, an operator may not be disposed near the control device 30, and test equipment is not needed.

Figure 2:
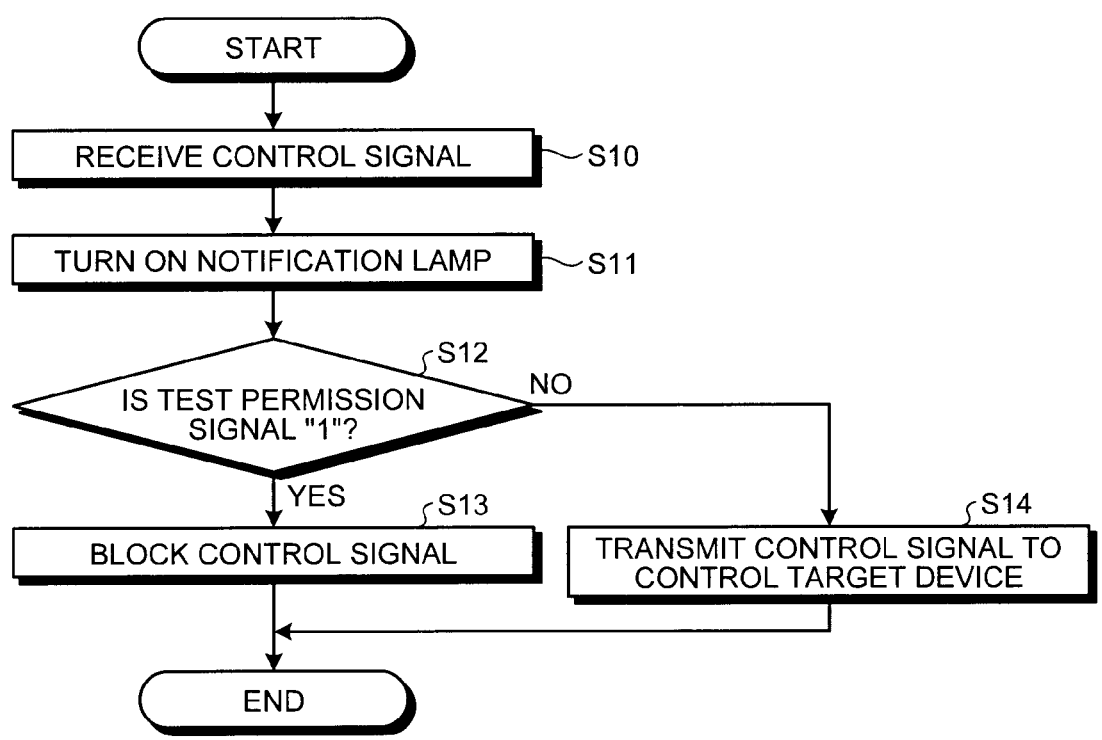
FIG. 2 is a flowchart illustrating an operation of a control device according to the first embodiment.

Next, an operation of the control device 30 illustrated in FIG. 1 will be described with reference to FIG. 2. FIG. 2 is a flowchart illustrating an operation of the control device 30. As illustrated in FIG. 2, in response to a control signal being received by the DI 31 of the control device 30 as step S10, the control device 30 turns on the notification lamp 12 of the operation terminal 10 as step S11.

Then, when a test permission signal transmitted from the operation terminal 10 is "1", that is, during a test with respect to an operation of the control button 21 (Yes in step S12), the control signal inhibition unit 33 inhibits a control signal from being transmitted to the control target device 40 as step S13. On the other hand, when a test permission signal transmitted from the operation terminal 10 is "0", that is, during a normal operation (No in step S12), the control signal inhibition unit 33 transmits a control signal to the control target device 40 as step S14.

As described in the foregoing, in the first embodiment, the control signal inhibition unit 33 is provided to block a control signal based on an operation of the test permission button 11, and the notification lamp 12 is provided to notify a state of a control signal irrespective of an operation of the control signal inhibition unit 33. Accordingly, it is possible to conduct a test of the nuclear power plant control system 1 while an operator inside the central control room 6 continues to operate the nuclear power plant.

Second Embodiment

In the first embodiment, an example of inhibiting a control signal from arriving at the control target device 40 during a test by transmitting a signal indicating a state of being on test from the operation terminal 10 to the control signal inhibition unit 33 by operating the operation terminal 10 has been described. However, a control signal may be inhibited from arriving at a device to be controlled during a test by another mechanism. Thus, in a second embodiment, an example of inhibiting a control signal from arriving at a device to be controlled during a test by using a majority circuit will be described.

Figure 3:
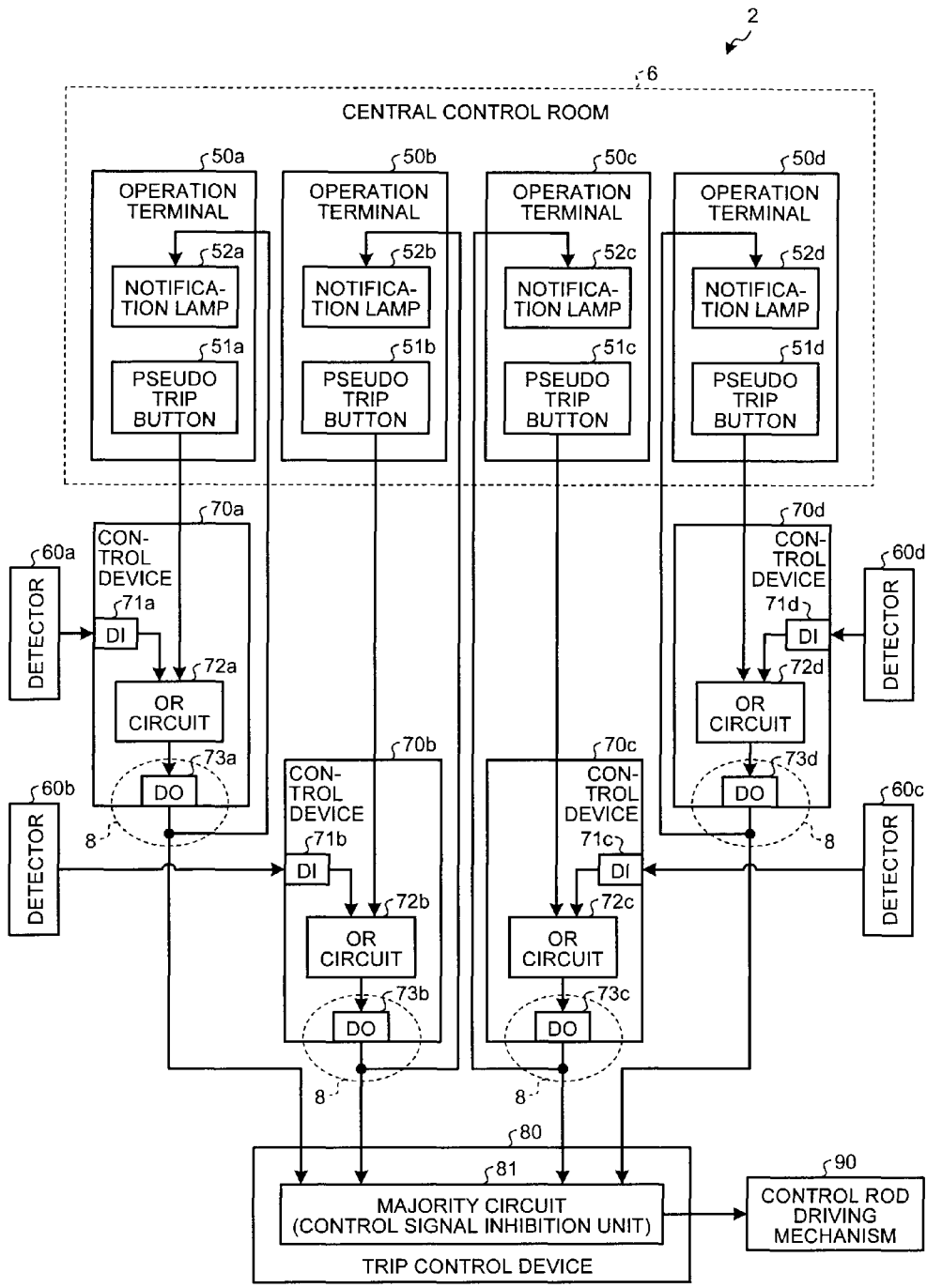
FIG. 3 is a diagram illustrating a schematic configuration of a nuclear power plant control system according to a second embodiment.

First, a configuration of a nuclear power plant control system according to the second embodiment will be described with reference to FIG. 3. FIG. 3 is a diagram illustrating a schematic configuration of a nuclear power plant control system 2 according to the second embodiment. As illustrated in FIG. 3, the nuclear power plant control system 2 includes operation terminals 50a to 50d, detectors 60a to 60d, control devices 70a to 70d, a trip control device 80, and a control rod driving mechanism 90. The operation terminals 50a to 50d are installed inside a central control room 6.

The detectors 60a to 60d include a sensor used to detect an occurrence of an event using a trip of a nuclear reactor, and a threshold calculation unit used to threshold-calculate a detected value of the sensor, respectively. Then, when a detected value of the sensor exceeds a threshold, the detectors 60a to 60d transmit a nuclear reactor trip signal, which is a control signal used to execute a trip of the nuclear reactor, to a control device 70. As described in the foregoing, the nuclear power plant control system 2 is configured such that four systems detect an occurrence of an event using a trip of the nuclear reactor independently of one another.

The trip control device 80 opens a power-supply circuit to the control rod driving mechanism 90 in response to a detection state in the detectors 60a to 60d. Specifically, the trip control device 80 includes a majority circuit 81, and the majority circuit 81 opens the power-supply circuit to the control rod driving mechanism 90 when a nuclear reactor trip signal is transmitted from at least two systems among the four systems.

As described above, by providing the majority circuit 81, it is possible to properly operate the nuclear power plant control system 2 even when a portion of the systems has an error. In addition, as described below, the majority circuit 81 functions as a control signal inhibition unit that inhibits the power-supply circuit from being opened to the control rod driving mechanism 90 during a test.

When the power-supply circuit is opened in the trip control device 80 and power is supplied, the control rod driving mechanism 90 trips the nuclear reactor by driving a control rod.

The control devices 70a to 70d perform predetermined arithmetic processing based on an input signal, and output a signal corresponding to a result of an operation. As a configuration associated with the nuclear reactor trip signal, the control device 70a includes a DI 71a, an OR circuit 72a and a DO 73a. As a configuration associated with the nuclear reactor trip signal, the control device 70b includes a DI 71b, an OR circuit 72b, and a DO 73b. As a configuration associated with the nuclear reactor trip signal, the control device 70c includes a DI 71c, an OR circuit 72c, and a DO 73c. As a configuration associated with the nuclear reactor trip signal, the control device 70d includes a DI 71d, an OR circuit 72d, and a DO 73d.

The DIs 71a to 71d receive a nuclear reactor trip signal transmitted from the detectors 60a to 60d, respectively. The OR circuits 72a to 72d output a signal, obtained by performing an OR operation on a nuclear reactor trip signal received by the DIs 71a to 71d and a pseudo nuclear reactor trip signal transmitted from the operation terminals 50a to 50d, to the DOs 73a to 73d, respectively. The DOs 73a to 73d transmit, as a nuclear reactor trip signal, a signal output from the OR circuits 72a to 72d to the trip control device 80, respectively. That is, from the control devices 70a to 70d, both a nuclear reactor trip signal transmitted from the detectors 60a to 60d and a pseudo nuclear reactor trip signal transmitted from the operation terminals 50a to 50d are transmitted as a nuclear reactor trip signal to the trip control device 80.

The operation terminals 50a to 50d receive various operations for operating a nuclear power plant, and show various types of information associated with an operation condition of the nuclear power plant. As a configuration associated with a test of the nuclear power plant control system 2, the operation terminal 50a includes a pseudo trip button 51a and a notification lamp 52a. As a configuration associated with a test of the nuclear power plant control system 2, the operation terminal 50b includes a pseudo trip button 51b and a notification lamp 52b. As a configuration associated with a test of the nuclear power plant control system 2, the operation terminal 50c includes a pseudo trip button 51c and a notification lamp 52c. As a configuration associated with a test of the nuclear power plant control system 2, the operation terminal 50d includes a pseudo trip button 51d and a notification lamp 52d.

The operation terminal 50a corresponds to the same system as that of the control device 70a. The operation terminal 50b corresponds to the same system as that of the control device 70b. The operation terminal 50c corresponds to the same system as that of the control device 70c. The operation terminal 50d corresponds to the same system as that of the control device 70d. It should be noted that the pseudo trip buttons 51a to 51d may be physical buttons, and may be virtual buttons displayed on a screen.

In response to the pseudo trip buttons 51a to 51d being operated, the operation terminals 50a to 50d transmit a pseudo nuclear reactor trip signal to a corresponding system according to a performed operation. The pseudo nuclear reactor trip signal transmitted from an operation terminal 50 arrives at the trip control device 80 through the control device 70 of the same system. However, as described above, the trip control device 80 opens the power-supply circuit to the control rod driving mechanism 90 when signals are transmitted from at least two systems. For this reason, even when one of the pseudo trip buttons 51a to 51d is operated and a pseudo nuclear reactor trip signal is transmitted, the power-supply circuit is not opened to the control rod driving mechanism 90 by the trip control device 80.

In addition, the nuclear power plant control system 2 is configured such that a signal transmitted from the DOs 73a to 73d branches before arriving at the trip control device 80, and the branching signal is transmitted to the operation terminal 50 of the same system. In response to receiving the branching signal, the operation terminals 50a to 50d turn on a notification lamp 52 of the respective operation terminals 50a to 50d. That is, the nuclear power plant control system 2 is configured such that when a signal transmitted in response to an operation of the pseudo trip buttons 51a to 51d is output from the DOs 73a to 73d to the trip control device 80, the corresponding information is notified by the notification lamps 52a to 52d even when the trip control device 80 is blocking a nuclear reactor trip signal.

In the nuclear power plant control system 2 having a configuration described above, when a test target portion 8 (a portion where a signal is output from the DOs 73a to 73d) illustrated in FIG. 3 is needed to be tested during an operation of the nuclear power plant, an operator inside the central control room 6 performs an operation as follows.

First, an operator operates one of the pseudo trip buttons 51a to 51d to cause a pseudo nuclear reactor trip signal to be transmitted from the operation terminal 50, and verifies that a notification lamp, among the notification lamps 52a to 52d, corresponding to an operated button is turned on. The operator verifies lighting by performing a similar operation for another button of the pseudo trip buttons 51a to 51d.

Through the operation described above, even when the nuclear power plant is in operation, it is possible to test whether the test target portion 8 is normally functioning for each system without opening the power-supply circuit to the control rod driving mechanism 90.

In addition, in the nuclear power plant control system 2, an operator may conduct a test while being inside the central control room 6, and thus test equipment and an operator who operates the test equipment are not needed similarly to the nuclear power plant control system 1.

Figure 4:
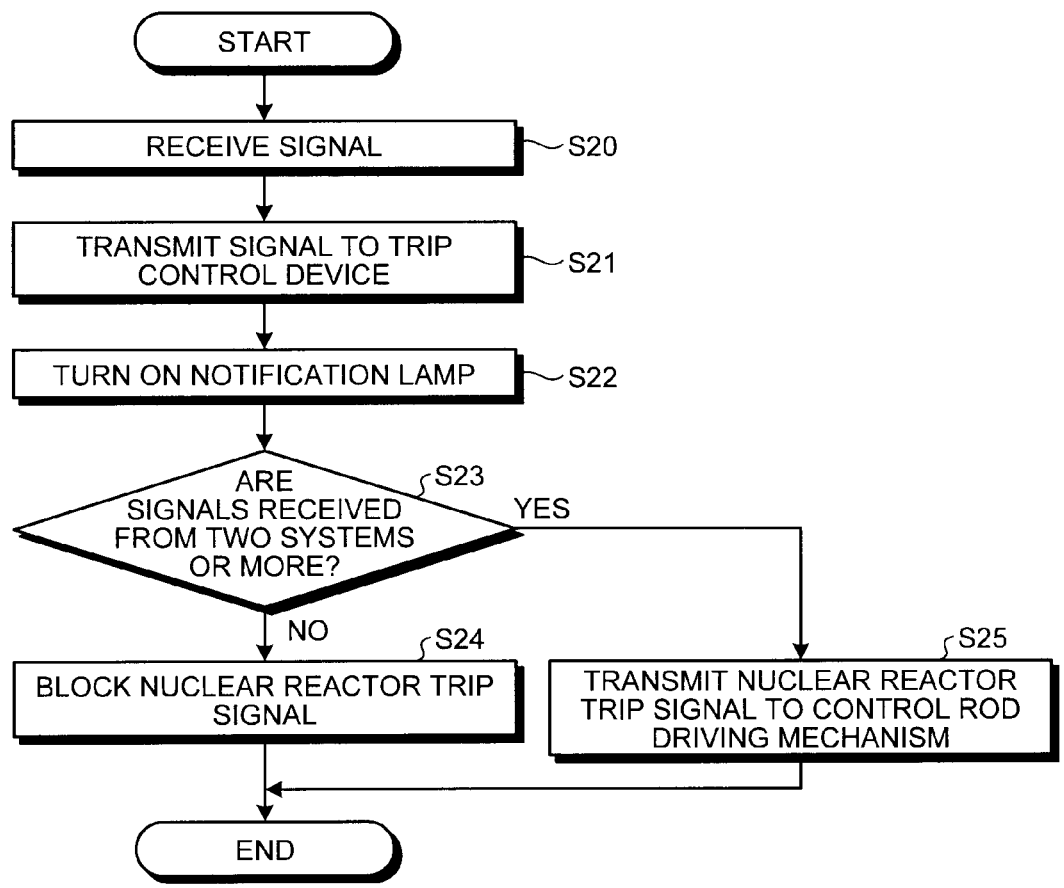
FIG. 4 is a flowchart illustrating an operation of a nuclear power plant control system according to the second embodiment.

Next, an operation of the nuclear power plant control system 2 illustrated in FIG. 3 will be described with reference to FIG. 4. FIG. 4 is a flowchart illustrating an operation of the nuclear power plant control system 2. As illustrated in FIG. 4, in response to receiving a signal (nuclear reactor trip signal or pseudo nuclear reactor trip signal) as step S20, the control device 70 transmits the received signal to the trip control device 80 as step S21.

In this instance, the nuclear power plant control system 2 turns on a notification lamp, among the notification lamps 52a to 52d, of a system corresponding to the received signal as step S22.

Then, when signals are not received from two systems or more (No in step S23), the trip control device 80 inhibits a nuclear reactor trip signal from being transmitted to the control rod driving mechanism 90 as step S24. On the other hand, when signals are received from two systems or more (Yes in step S23), the trip control device 80 transmits a nuclear reactor trip signal to the control rod driving mechanism 90 as step S25.

As described in the foregoing, in the second embodiment, a pseudo nuclear reactor trip signal may be transmitted to the trip control device 80 including the majority circuit 81 for each system, and the notification lamps 52a to 52d are provided to notify a circumstance of transmitting a signal to the trip control device 80 irrespective of an operation of the majority circuit 81. Accordingly, it is possible to conduct a test of the nuclear power plant control system 2 while an operator inside the central control room 6 continues to operate the nuclear power plant.

It should be noted that a configuration of the nuclear power plant control system described in each embodiment above may be arbitrarily changed within a scope not departing the spirit of the invention. For example, configurations of the nuclear power plant control systems described in the respective embodiments above may be arbitrarily combined together.

In addition, in each embodiment above, a notification lamp is turned on to notify a test result. However, as a scheme of notifying a test result, various schemes such as a scheme using a notification sound, a scheme of displaying a result using a character or a symbol on a screen may be used.

REFERENCE SIGNS LIST 1, 2 NUCLEAR POWER PLANT CONTROL SYSTEM
6 CENTRAL CONTROL ROOM
7, 8 TEST TARGET PORTION
10, 50a to 50d OPERATION TERMINAL
11 TEST PERMISSION BUTTON
12, 52a to 52d NOTIFICATION LAMP
20 CONTROL PANEL
21 CONTROL BUTTON
30, 70a to 70d CONTROL DEVICE
31, 71a to 71d DI
32, 73a to 73d DO
33 CONTROL SIGNAL INHIBITION UNIT
33a NOT CIRCUIT
33b AND CIRCUIT
40 CONTROL TARGET DEVICE
51a to 51d PSEUDO TRIP BUTTON
60a to 60d DETECTOR
72a to 72d OR CIRCUIT
80 TRIP CONTROL DEVICE
81 MAJORITY CIRCUIT
90 CONTROL ROD DRIVING MECHANISM

The invention claimed is:

1. A nuclear power plant control system comprising:
four systems each comprising:
an operation unit which is configured to receive an operation for controlling a specific portion of a nuclear power plant and to transmit a pseudo nuclear reactor trip signal;
a notification unit which is configured to notify that a control signal corresponding to the operation received by the operation unit arrives at a predetermined position on a path connected to the portion;
a detecting unit which is configured to output a control signal; and
an OR circuit which is electrically connected to the operation unit and the detecting unit to perform a logical addition between the pseudo nuclear reactor trip signal from the operation unit and the control signal from the detecting unit;
a control rod driving mechanism; and
an inhabitation unit which includes a majority circuit that is electrically connected to output sides of the four systems, wherein
the majority circuit is configured to cause a nuclear reactor trip signal to arrive at the portion when receiving the control signals from the detecting units of at least two systems out of four systems to open a power-supply circuit to the control rod driving mechanism, and
the respective notification units are connected between the respective OR circuits and the majority circuit.

2. The nuclear power plant control system according to claim 1, wherein
the operation unit is provided in a central control room of the nuclear power plant, and
the notification unit notifies an operator present in the central control room.

3. A method of testing the nuclear power plant control system according to claim 1 comprising:
receiving an operation through an operation unit which receives an operation for controlling a predetermined portion of a nuclear power plant;
detecting a control signal corresponding to the operation received by the operation unit at a predetermined position on a path connected to the portion;
notifying that the control signal arrives at the predetermined position; and
inhibiting the control signal from arriving at the portion in a position between the predetermined position on the path and the portion.

* * * * *